Feb. 3, 1942.  R. M. HEINTZ  2,271,640
POWER TRANSMISSION DEVICE
Filed May 4, 1940   2 Sheets-Sheet 1

INVENTOR,
RALPH M. HEINTZ.
BY Lippincott + Metcalf
ATTORNEYS.

Feb. 3, 1942.   R. M. HEINTZ   2,271,640
POWER TRANSMISSION DEVICE
Filed May 4, 1940   2 Sheets-Sheet 2

INVENTOR.
RALPH M. HEINTZ.
BY Lippincott + Metcalf
ATTORNEYS.

Patented Feb. 3, 1942

2,271,640

UNITED STATES PATENT OFFICE 2,271,640

POWER TRANSMISSION DEVICE

Ralph M. Heintz, Palo Alto, Calif., assignor, by mesne assignments, to Jack & Heintz, Inc., Cleveland, Ohio, a corporation of Ohio Application May 4, 1940, Serial No. 333,376

10 Claims. (Cl. 74—291)

This invention relates to power transmission gearing, and although adapted and here described for embodiment in an impulse starter such as is used for airplane engines, the invention is not limited to such use but is adaptable for employment wherever it is necessary to limit the magnitude of a force which must be suddenly applied or in other cases where it is desirable to combine a friction unit mechanism with gearing.

Among the objects of my invention are: To provide a friction unit which will release automatically when the forces to be transmitted exceed a certain limiting value, but which will not slip appreciably below such value; to provide a friction plate-and-gear combination which is exceedingly light and compact in relation to the power to be transmitted thereby; to provide a friction brake unit mechanism which is especially adapted for embodiment in an epicyclic gearing; to provide a friction unit-and-gear combination which permits an impulse starter to be constructed in much less space than is customary for devices of like power; to provide a brake unit of novel form which may, by a slight modification, be either constructed as a self-loosening or a self-tightening brake, or, if desired, as a "slipping brake"; and to provide a motor starter of the impulse type, which is capable of starting the largest of the aircraft engines now customarily used, and which is, at the same time, of smaller dimensions for a given output than any which are known to the applicant to have been produced up to the present time. A further object of my invention is to provide a friction unit which will release when a certain maximum torque is applied in either direction making it unnecessary to supply right and left hand starters.

Other objects of my invention will be apparent or will be specifically pointed out in the description forming a part of this specification, but I do not limit myself to the embodiment of the invention herein described, as various forms may be adopted within the scope of the claims.

Referring to the drawings.

Figure 1:
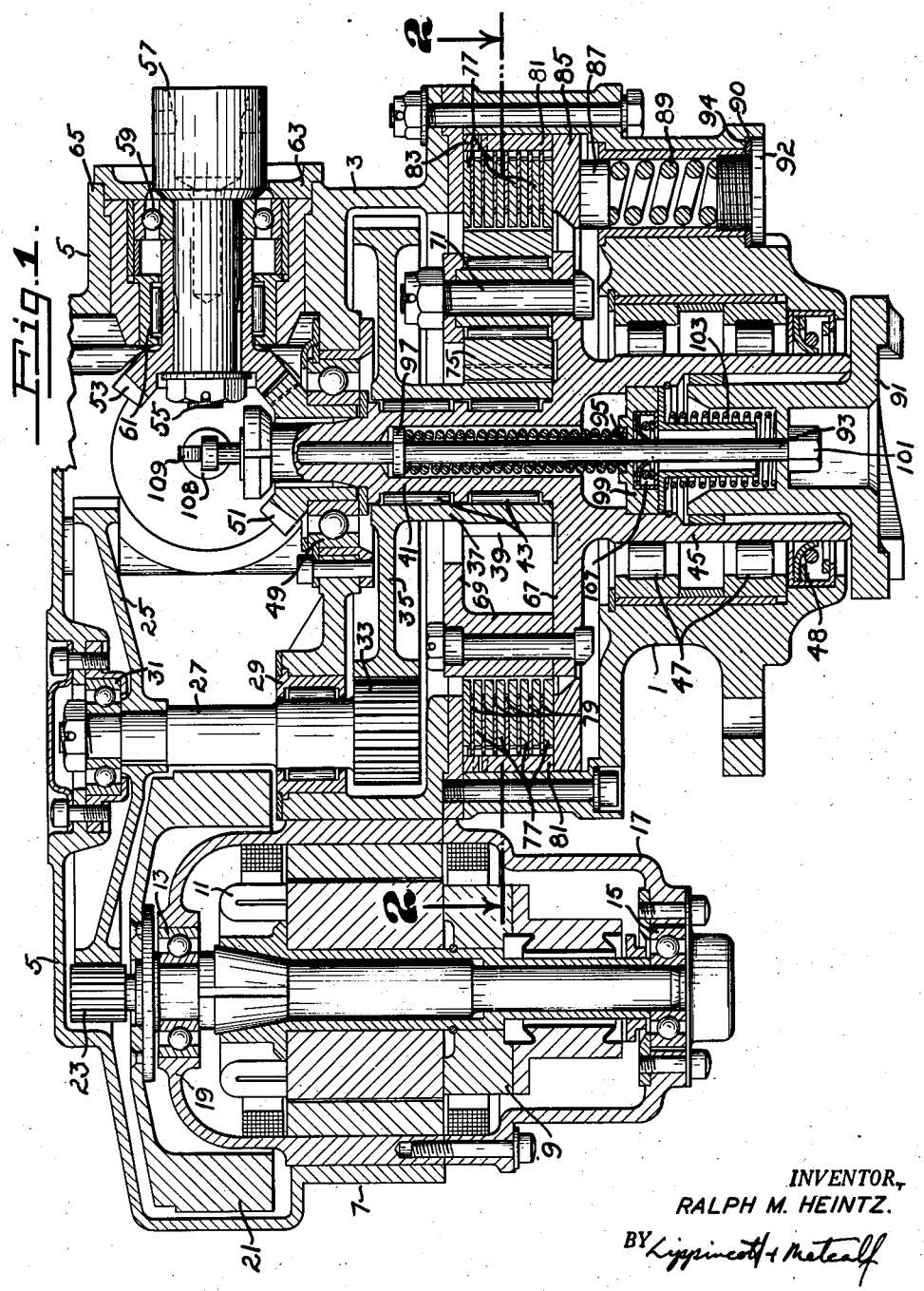
Fig. 1 is a sectional view of an impulse starter embodying my invention, the plane of section being taken on the plane defined by the axes of the starting shaft and the motor shaft of such starter.
Figure 2:
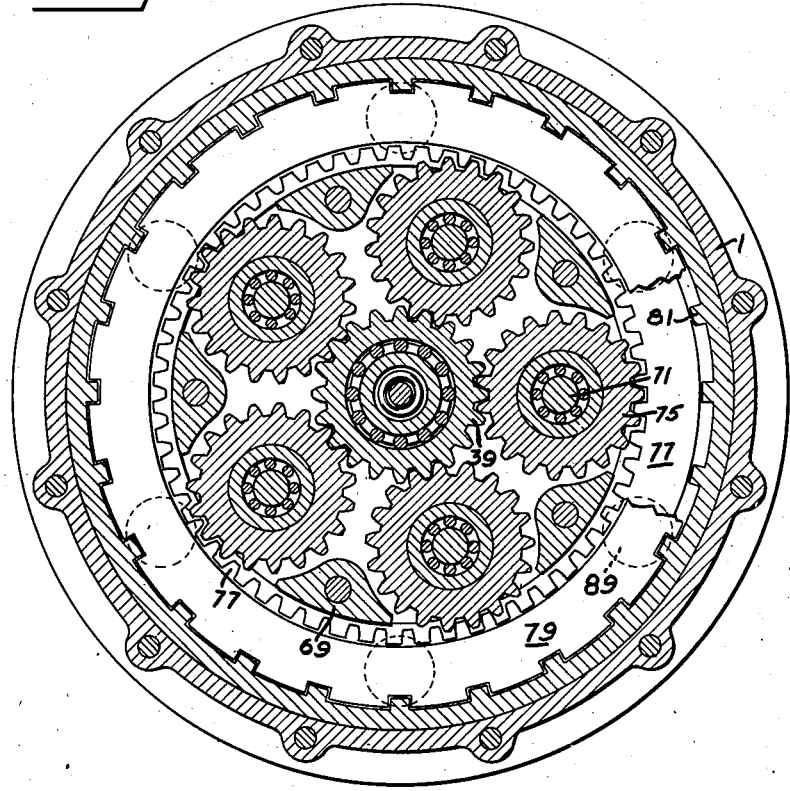
Fig. 2 is a sectional view taken on the line 2—2 of Fig. 1.

Considered broadly, the invention to which this application is specifically directed is a combined gear and friction unit of the multiple plate type, and it comprises the combination with a driving gear of one or more friction planar members for meshing with such driving gear and unrestrained, except frictionally, with respect to rotary motion. In contact or interleaved with such planar members is one or, preferably a plurality of similar planar members which are untoothed, but which are restrained by suitable means against rotation with respect to the member against which the driving gear normally reacts, all of the friction planar members, however, being free to move to some extent in a direction normal to their own plane, so that when a compressive force is applied in such direction they will act as a friction unit. Means are provided for applying such compressive force, and in the preferred form here shown there is also provided means actuated by rotational stress applied to the interleaved members for varying the compressive stress, thus making the holding power of the friction unit depend upon the force which it is required to transmit.

Less broadly, but still in general terms, the invention in its preferred form comprises a combination multiple plate friction unit and ring gear, wherein certain of the alternate plates of the friction unit are annuli formed with internal gear teeth, and the other plates, interleaved with the first mentioned plates, are splined to a reaction ring to which stress supplied by the "driving" gear (which may, of course, under other circumstances become the driven gear) is transferred. By forming cam surfaces between the reaction ring and the member to which pressure is supplied to the friction plates, the reaction can be made to vary the compression applied. As used in the present embodiment the reaction is used to release the pressure, causing the friction members to slip freely when the reaction rises above a predetermined value, but by applying the camming action to tighten instead of to release the said members, they may be made a self-tightening or servo unit, while for still other purposes the tension on the unit may be made independent of the reaction forces. It will be seen that the camming action can be made such that the friction unit can be made to release irrespective of the direction the torque is applied.

For the purpose of indicating not only the invention itself but also one of its primary fields of usefulness, it is shown in the drawings as embodied in an impulse starter for aircraft engines. The starter is mounted in and supported by a housing comprising three principal parts; i. e., a base 1, a central portion or superstructure 3, and a cap 5. To the left of the main housing, as depicted in the drawings, there is formed a generally semicylindrical recess, provided with an also generally semicylindrical cover 7, which combine to form a separate housing for a high speed driving motor 9, whose armature 11 is supported on ball bearings 13 and 15, mounted respectively in the commutator cover 17 and the motor frame 19.

The motor armature is designed safely to attain a speed of approximately twenty-four thousand revolutions per minute, and carries upon its shaft a flywheel 21, weighing, in the present instance, about three pounds, and a driving pinion 23. This pinion meshes with a gear 25, having a diameter ten times that of the pinion 23. The gear is mounted on a shaft 27, journaled in a needle bearing 29, mounted in the superstructure 3, and a ball bearing 31, mounted in the cap 5. The gear 25 is dished to receive the ball bearing 31, thus conserving space.

The inner end of the shaft 27 carries a pinion 33 which meshes with a gear 35 to give a second reduction of about 5:1. The gear 35 is formed on a barrel shaft 37 on which is formed an integral sun-gear 39, the barrel 45 being mounted on an inner or main shaft 41 and journaled on needle bearings 43. The shaft 41 is an integral extension of the barrel or driven shaft 45 which is journaled in main roller bearings 47 in the base 1 and is sealed against the entrance of engine oil by a resilient washer 48. The free end of the shaft 41 is mounted in a ball bearing 49, and carries a bevel gear 51, meshing with a second bevel gear 53 by means of which the starter may be hand cranked, the gear 53 being mounted on a shaft 55 terminating in a crank socket 57. The bearings 59 and 61 carrying the stub shaft are mounted in a fitting 63 which may be positioned in any one of the sockets 65 (as shown in Fig. 1) this arrangement giving three optional mountings of the hand crank, any one of which may be used, depending upon the position in which the starter is mounted. The two sockets which are not utilized for the crank receive respectively the booster coil for firing the motor before the magneto has been brought up to speed and the solenoid which engages the starter to the engine.

The barrel shaft 45 is integral with a flange 67, to which is bolted a spider ring 69, carrying planet gear shafts 71 on which the planet gears 75 are journaled on needle rollers. The planet gears mesh with the combined ring gear and friction unit to which this application is specifically directed.

Figure 3:
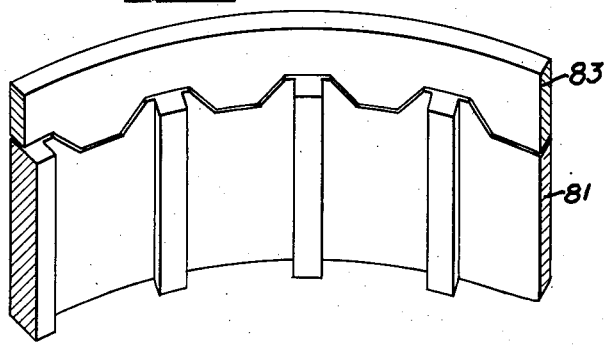
Fig. 3 is a fragmentary perspective view of the friction releasing rings.

The gear teeth are formed internally on a plurality of annuli 77, which form one set of plates of a multiple plate friction unit. Except as restrained frictionally and alined by the meshing teeth of the planet gear, these annular plates are perfectly free. They are interleaved by a second plurality of plates 79, which are splined to a reaction ring 81. This ring is free as far as any direct connection with the housing is concerned, but its upper face is crenelated, as is shown in Fig. 3, to form a succession of oppositely inclined surfaces meshing with those on a somewhat similar or secondary ring 83, this latter ring being secured against movement with respect to the housing. A pressure ring 85, urged by the spring-pressed plunger 87, coacts with the stack of annuli and the ring 81, forcing the friction plates into engagement. The ring 85 is doweled so that it can move perpendicular to its own plane, but is held against rotation with respect to the housing. The springs 89, in the present instance six in number, are equally spaced around the periphery of the ring 85.

It will be seen that when the planet gears rotate, driven by the sun-gear, they will tend to rotate the toothed annuli in the opposite direction, and due to the friction of the interleaved plates they will carry with them the plates 79 and the cam ring 81, since the friction on the single surface between the pressure ring 85 and the lower of the plates 77 is not considerable in comparison to the total forces involved. The rotation will continue until the cam surfaces on the ring 81 meet the coacting surfaces on the ring 83. Further rotation in the same direction is resisted by the springs 89, since the cam surfaces tend to separate the rings 81 and 83, no matter which direction the cam surface is rotated. When, however, the resistance to the driving torque on the member 45 exceeds the rotational force which is dependent upon the pressure on the springs the ring 81 will shift downwardly, carrying with it the pressure ring 85, and compressing the springs 89 will release the friction unit. This allows the annuli 77 momentarily to rotate freely, and releases the force which tends to rotate ring 81, so that the springs again exert their force on the friction plates. In operation, the release and reengagement of the friction members 77—79 take place very rapidly, exerting a mean force upon the planet spider and main barrel or driving member 45 which serves to absorb the shock of a sudden load impressed upon the barrel, which cushions the shock of sudden engagement of the starter or engine back-fire. The device therefore acts in some degree like an ordinary slipping brake, but it is possible to regulate the maximum force which it will exert much more accurately than can be done with a slipping brake of the ordinary type, and when the friction parts 77—79 finally do become fully engaged they actually operate with little if any slip. The ratio of force between the planet spider and the ring gear is greater than one, which by giving the friction unit a mechanical advantage makes it possible to use a smaller and quicker acting friction unit than would be possible if it were mounted on the output shaft.

A feature of the device is the washer 90, by which the pressure on the friction plates 77 and 79 is regulated. This washer is fabricated from separable shim stock, and by peeling off one layer the compressive force on the plates 77 and 79 may be increased by a predetermined amount. In practice the thickness is so coordinated with the strength of the springs that the removal of one layer increases the holding power of the clutch 50 ft.-lb. Therefore, when in service the friction members start to slip owing to the wearing of the elements thereof, it is only necessary to remove compression screw 92 from each of the plunger assemblies, peel off a shim from each washer 90, and replace the screws to seat against the shoulders 94, thereby tightening the friction unit certainly and accurately and without the necessity of using the elaborate test and equalizing equipment required with such units of other types.

As shown in the drawings, the planetary or epicyclic gear has a step-down ratio of 4:1, which, with the other gearing already described, gives the total device a speed reduction of 200:1, and operates the barrel shaft 45 at 120 R. P. M., at the instant that the starter is first engaged.

The starter operates to turn the motor over by a jaw or engine engaging clutch which is similar to those customarily used in such devices. The clutch head 91 is splined inside of the barrel shaft 45. Through it runs a small shaft 93, encircled by a compression spring 95 which acts against a collar 97 on the shaft and a bearing block 99 within the barrel to hold the clutch member 91 normally retracted. The shaft 93 slides freely within the jaw member, and the latter is forced against the head of the nut 101 on the end of the shaft by a lighter compression spring 103 which presses against the bearing block 99 through the medium of a guide bushing 105. A resilient oil sealing member 107 is mounted within the bearing block 99 to block entrance of engine oil or grease along the shaft.

In operation the flywheel 21 is brought up to speed either by means of the motor, or through a hand crank operating through the gear train already described. When it is fully up to speed the engine clutch-engaging solenoid, mounted in any one of the sockets 65, is actuated, causing its plunger 108 to actuate the bell crank 109 and depress the shaft 93. This permits the spring 103 to expand and cause the clutch member 91 to engage the coacting member on the engine shaft. Owing to the enormous energy stored in the flywheel 21, and the great inertia of the engine mechanism, this engagement would produce such stresses as to damage the gear train or the engine were it not for the action of the friction unit which releases them when they rise to a predetermined value, the unit operating with less and less slippage until the engine has been brought up to speed. When the engine fires, its speed immediately exceeds that of the clutch member 91, but since the latter is free to move away from the coacting member on the engine, this causes no damage.

Although the device has been described specifically in connection with a particular application, it will be seen that it is reversible as to both parts and function. Thus, as far as the reaction and stresses are concerned, it makes no difference whether the ring be a stationary member, as here shown, or whether it is used as the rotational part of the gear; in either case the relative motion of the parts is the same, even though the actual motion may be different. It is for this reason that I have used the term "reaction member" in describing the structure to which the stationary parts of the friction unit are secured. Whether this member be stationary or movable it still must carry the reaction of the driving force.

I am aware that gears have often in the past been used as slipping friction members, one of the commonest of such utilizations being in connection with the setting of a watch or a clock. There are two important differentia, however, between such an arrangement and the one here described. The first of these is that where the gears are mounted on a shaft the lever arm of the frictional moment must be low in comparison with the moment applied to the gear teeth, whereas in the structure here shown the lever arm of the frictional moment is greater than that supplied to the teeth. The second and perhaps more important differentium is that in my device the holding power of the friction unit is varied by the rotating moment applied to the gear. The most generally useful application of this device is that here shown, where the moments serve to tend to release the friction unit and thus limit the stresses applied to the gears, but there are other conditions where, by mere reversal of parts, the compressional forces upon the said unit can be made to increase, thus giving the unit a servo action.

I claim:

1. In a planetary gear system of the class described, in combination, a planet gear, a member driven from the planet gear, a reaction ring surrounding the planet gear and spaced therefrom, means supporting the reaction ring, a friction unit comprising complemental parts including a part having teeth meshing with the planet gear, and another part interlocking with the reaction ring, said parts adapted to frictionally engage and being separable for release action, the reaction ring having cam means at an end thereof, a secondary ring associated with the reaction ring at the cam end of the latter and having cam means to cooperate with the cam surfaces of the reaction ring, means for pressing the above mentioned complemental parts of the friction unit together so that their cam surfaces are normally conditioned to coact during application of torque resisting the movement of the driven member to release the frictional engagement of the said complemental parts of the friction unit, means for holding one of said rings against rotation and for supporting the other ring for rotation relative thereto, said reaction ring and the complemental parts coacting therewith constituting gear elements of the planetary gearing.

2. Gear mechanism in accordance with claim 1, wherein the reaction ring and the secondary ring are disposed so as to encircle the complemental parts of the friction unit at the outer planar edges of said complemental parts.

3. Mechanism in accordance with claim 1, wherein the cooperating camming means of each the reaction ring and secondary ring are disposed at opposite inclinations to effect release action of the complemental parts of the friction unit incident to resistance torque in opposite directions on the driven member greater than the driving force transmitted to the latter.

4. In planetary gear mechanism of the class described, in combination, a driven member, planet gears for driving the driven member, a reaction ring surrounding the planet gears and spaced therefrom, a friction unit comprising multiple plates inter-geared to the planet gears and interleaved multiple plates interlocked with the reaction ring, said plates adapted to frictionally engage and separate for release action, the reaction ring having cam means, a secondary ring associated with the reaction ring and having cam means to cooperate with the cam means of the reaction ring, means for pressing the above mentioned plates of the friction unit together with a predetermined force for restraining relative motion, said rings cooperating with the pressure means whereby their cam surfaces are normally conditioned to coact during application of torque resisting the movement of the driven member so that the camming means between the said rings may release the frictional engagement of the said friction plates, means for restraining one of said rings against rotation relatively to the other ring, said reaction ring and the multiple plates cooperating therewith constituting gear elements of the planetary gearing, said pressure means cooperating with the multiple plates of the friction unit comprising a pressure ring coacting with the said friction unit plates and bearing against one of them, said pressure ring being disposed so as to coact with the reaction ring and secondary ring to maintain the camming means of the latter two rings in cooperative relation.

5. In release mechanism of the class described, in combination, a driven member, a reaction ring surrounding the planet gears and spaced therefrom, a housing enclosing and supporting the reaction ring for slight rotative movement, a friction unit comprising multiple plates intergeared to the planetary gears, and interleaved multiple plates interlocked to the reaction ring, said plates being adapted to frictionally engage and to separate for release action, the reaction ring having cam means, a secondary ring associated with the reaction ring and having cam means to cooperate with the cam surfaces of the reacting ring, means for pressing the above mentioned multiple plates of the friction unit together, said rings cooperating with the pressure means whereby their cam surfaces are normally conditioned to coact during application of torque resisting the movement of the driven shaft, so that the camming means between the said rings may release the frictional engagement of the said plates, one of said rings being restrained by the housing against rotation relatively to the other ring, said reaction ring and the multiple plates constituting gear elements of the planetary gearing, the pressure means cooperating with the plates of the friction unit comprising a spring actuated pressure ring engaging one of said plates and projecting beyond the last mentioned plate for engagement with the reaction ring for forcing the reacting ring and secondary ring together at their camming portions.

6. In planetary gear mechanism of the class described, in combination, a driven member, planet gears for driving the driven member, a friction unit cooperating with the planet gears and comprising a series of friction plates encircling the planet gears and having internal teeth engaging the teeth of the said planet gears, a series of second friction plates interleaved between the plates of the first series, a housing enclosing said gear parts, a reaction ring encircling the two interleaved series of friction plates and rotative relatively to the housing and having interlocking connection with the external portions of the friction plates of the second series aforesaid, a secondary ring disposed in alignment with the reaction ring, said secondary ring and reaction ring having coacting cam surfaces at adjacent ends, means to fix the secondary ring against rotation relatively to the housing, and a spring actuated pressure ring cooperating to maintain the friction plates of the friction unit in frictional engagement and acting upon the reaction ring and secondary ring member to condition the cam surfaces of these members for cooperation to effect releasing separation of the same upon excessive resistance torque on the driven member.

7. Gearing mechanism as claimed in claim 6, in which the pressure ring directly engages one of the friction plates of said series of plates and directly engages the reaction ring, and means for holding the pressure ring rotatively stationary relatively to the friction unit.

8. Planetary gear mechanism as claimed in claim 6, in which the pressure ring directly engages one of the friction plates of said series of plates and directly engages the reaction ring, and means for holding the pressure ring rotatively stationary relatively to the friction unit, said housing having means limiting the movement of the friction unit in one direction and the pressure ring being disposed at the opposite portion of the friction unit to establish its frictional engagement with one of the friction plates of said series.

9. In a planetary gear mechanism of the class described, in combination, planet gears, a ring gear comprising a plurality of friction plates having internal gear teeth adapted to mesh with one or more planet gears, a second series of friction plates interleaved with those first mentioned and having external teeth, a rotative reaction ring engaging said external teeth, a relatively stationary ring having camming teeth formed thereon, one of said rings being movable axially, said reaction ring having camming teeth positioned so as to comate with those of said stationary ring, means for applying resilient pressure to the interleaved plates to frictionally hold the same against rotation until released by the camming action of the camming teeth of the rings for lessening of said resilient pressure thereby.

10. A friction device having a plurality of ring-like friction plates, said plates having teeth at the inner periphery thereof, other ring-like friction plates having teeth at their outer peripheries and interleaved with the first said plates, and movable rotatively relative thereto, the plates having the inner teeth comprising the ring gear of a planetary system, holding means coacting with the outer teeth of the certain plates above mentioned tending to hold the same against rotary motion while permitting axial motion, means for applying resilient pressure to bring the aforementioned plates into frictional engagement, and means coacting with said holding means to release the frictional engagement between the friction plates on predetermined resistance to movement of the first friction plates.

RALPH M. HEINTZ.